US009728029B2

(12) United States Patent
Wolter

(10) Patent No.: US 9,728,029 B2
(45) Date of Patent: Aug. 8, 2017

(54) APPARATUS FOR STORING AND FULLY AUTOMATICALLY DISPENSING A MULTIPLICITY OF PRODUCTS

(71) Applicant: SAFELOG GMBH, Kirchheim bei München (DE)

(72) Inventor: Michael Wolter, Kirchheim bei München (DE)

(73) Assignee: Safelog GmbH, Kirchheim Bei Munich (DE)

( * ) Notice: Subject to any disclaimer, the term of this patent is extended or adjusted under 35 U.S.C. 154(b) by 214 days.

(21) Appl. No.: 14/229,434

(22) Filed: Mar. 28, 2014

(65) Prior Publication Data
US 2014/0212250 A1    Jul. 31, 2014

Related U.S. Application Data

(63) Continuation of application No. PCT/EP2012/004059, filed on Sep. 27, 2012.

(30) Foreign Application Priority Data

Sep. 28, 2011 (DE) .................. 10 2011 115 663

(51) Int. Cl.
G07F 11/16 (2006.01)
B65G 1/04 (2006.01)
(52) U.S. Cl.
CPC .......... *G07F 11/165* (2013.01); *B65G 1/0435* (2013.01)
(58) Field of Classification Search
CPC ..... G07F 11/165; G07F 11/62; B65G 1/0421; B65G 1/0435; B65G 1/06; H04L 67/02
See application file for complete search history.

(56) References Cited

U.S. PATENT DOCUMENTS 4,779,151 A * 10/1988 Lind et al. .................. 360/92.1
4,812,629 A    3/1989 O'Neil et al.
5,094,584 A *  3/1992 Bullock ........................ 414/800
(Continued)

FOREIGN PATENT DOCUMENTS

BE    1013145 A6    10/2001
DE    20001122 U1    8/2000
(Continued)

OTHER PUBLICATIONS

International Search Report for Corresponding Application No. PCT/EP2012/004059 mailed Dec. 14, 2012.

*Primary Examiner* — Glenn Myers
(74) *Attorney, Agent, or Firm* — Myers Wolin, LLC

(57) ABSTRACT

The present invention relates to an apparatus for storing and fully automatic output of a multiplicity of different products having substantially cuboid geometry, such as packaged CDs, DVDs, printer cartridges, books, etc., comprising at least one permanently installed storage rack for stocking the multiplicity of products, at least one selection station for selecting, from the multiplicity of stocked products, one product to be output by the apparatus at a product output point, at least one handling device that is movable relative to the at least one storage rack for retrieval of a selected product from the at least one storage rack and for transport of the product in question to a product output point of the apparatus, and at least one computer-assisted control unit for controlling the apparatus and its components.

15 Claims, 10 Drawing Sheets

(56) References Cited

U.S. PATENT DOCUMENTS

| | | | | |
|---|---|---|---|---|
| 5,277,534 | A | * | 1/1994 | Anderson et al. ............ 414/281 |
| 5,872,751 | A | | 2/1999 | Utsumi et al. |
| 6,257,821 | B1 | * | 7/2001 | Ward et al. ................... 414/276 |
| 7,787,985 | B2 | * | 8/2010 | Tsujimoto ................ B65G 1/06 414/273 |
| 2002/0018706 | A1 | * | 2/2002 | Young et al. ................. 414/276 |
| 2002/0150450 | A1 | * | 10/2002 | Bevirt et al. ............. 414/225.01 |
| 2005/0095094 | A1 | * | 5/2005 | Maynard et al. ............. 414/280 |
| 2012/0288347 | A1 | * | 11/2012 | Minami ....................... 414/217 |

FOREIGN PATENT DOCUMENTS

| | | |
|---|---|---|
| DE | 19940978 A1 | 3/2001 |
| DE | 102005012516 A1 | 9/2006 |
| DE | 102007025488 B3 | 9/2008 |
| JP | 2005096027 A * | 4/2005 |

\* cited by examiner

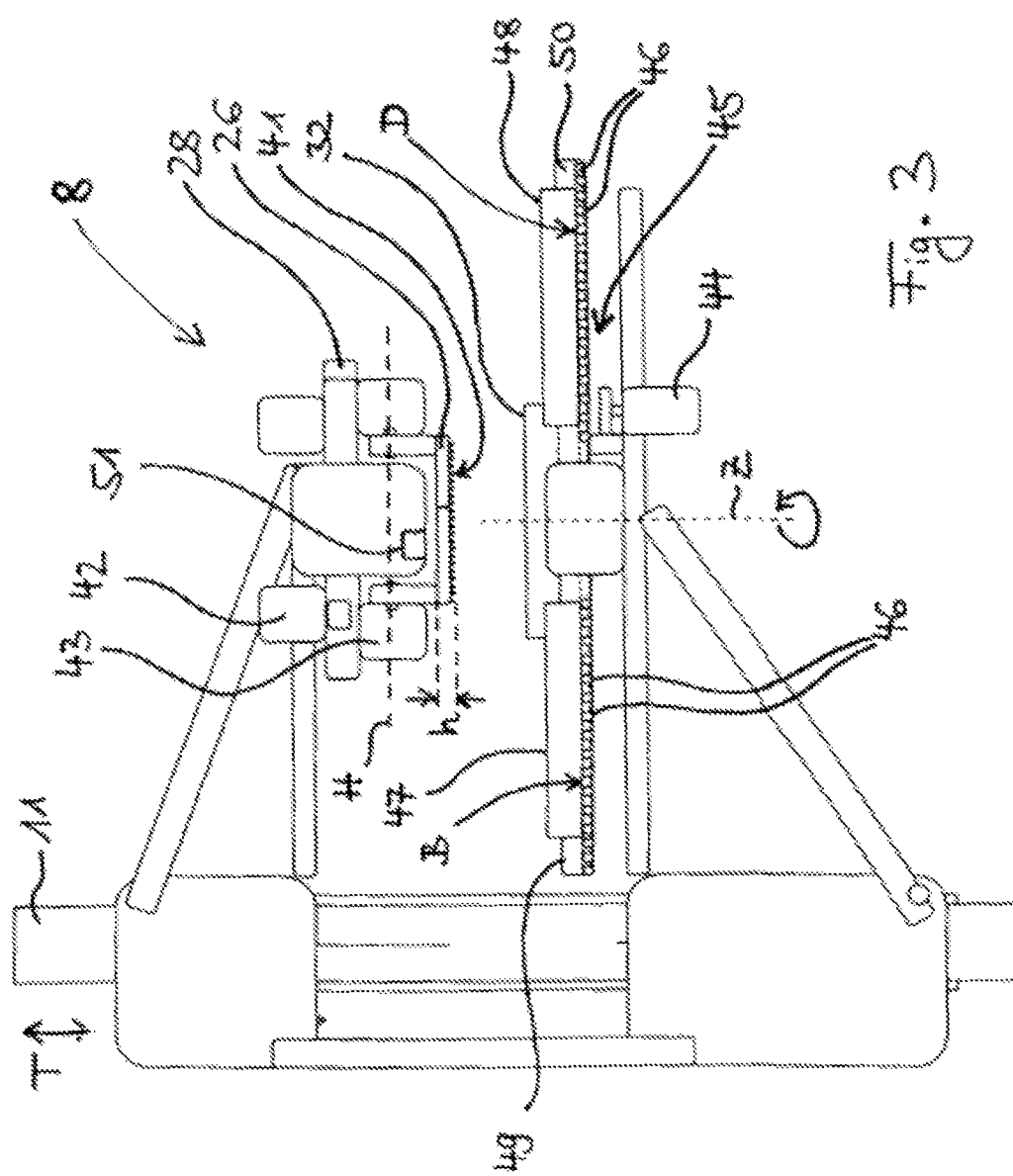

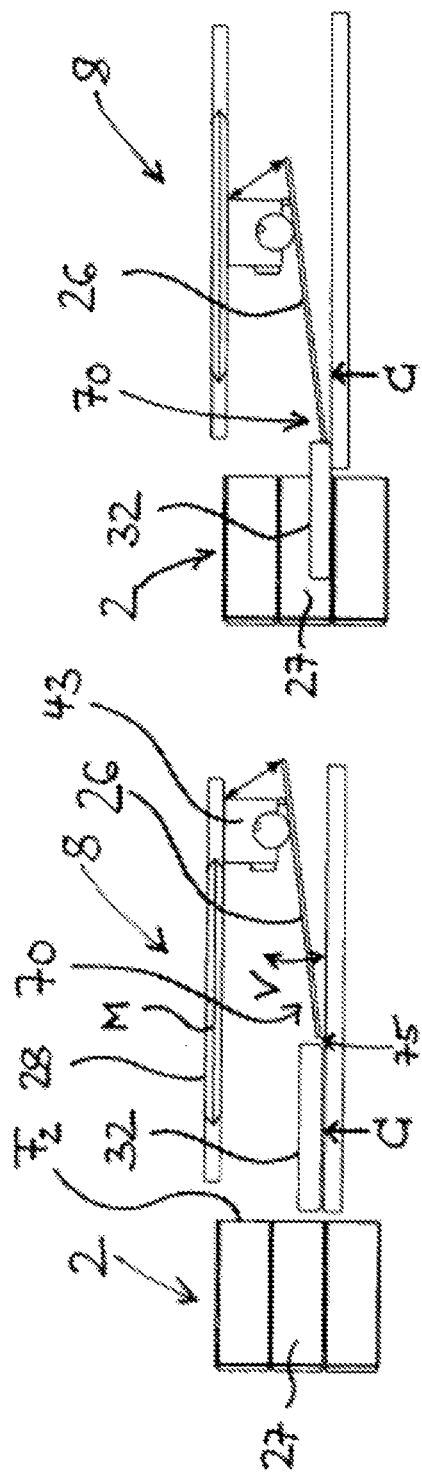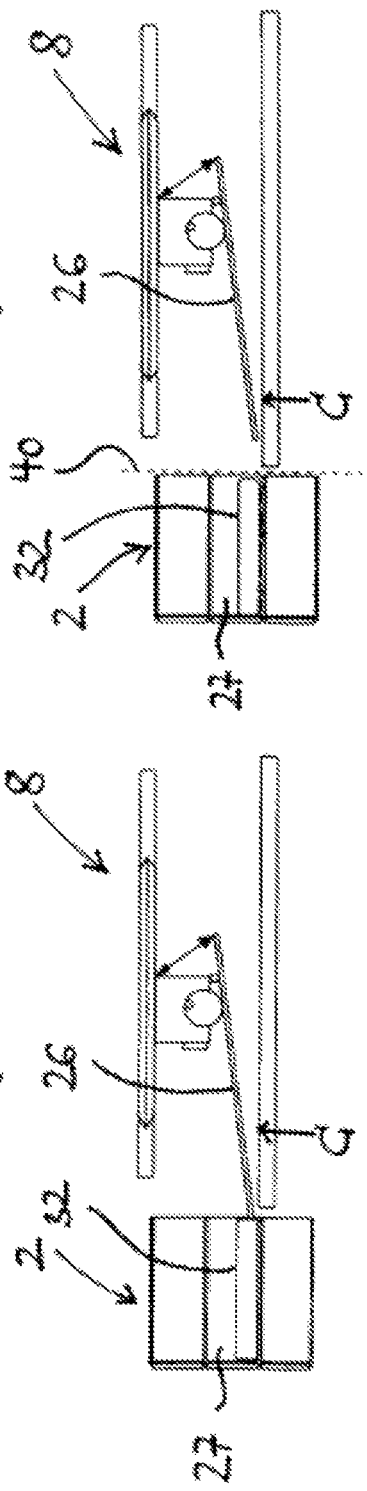

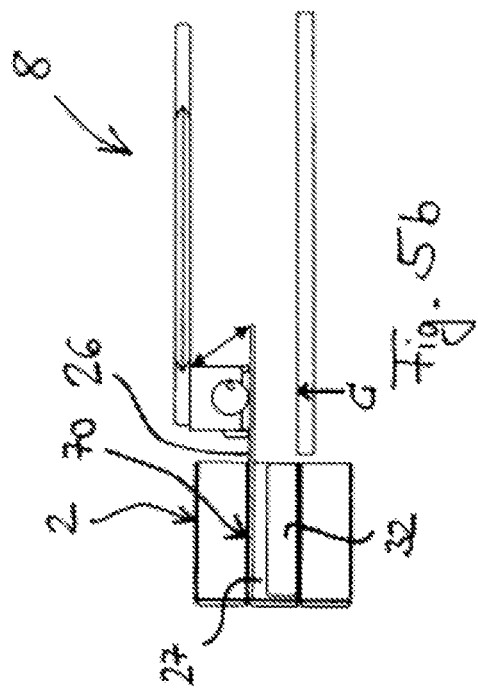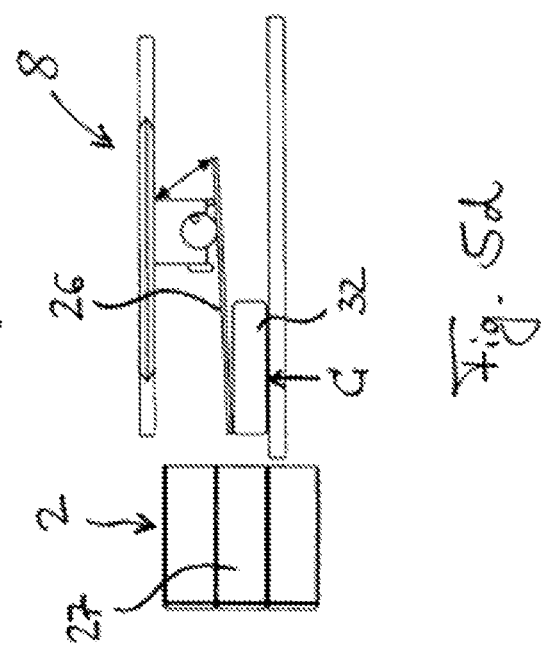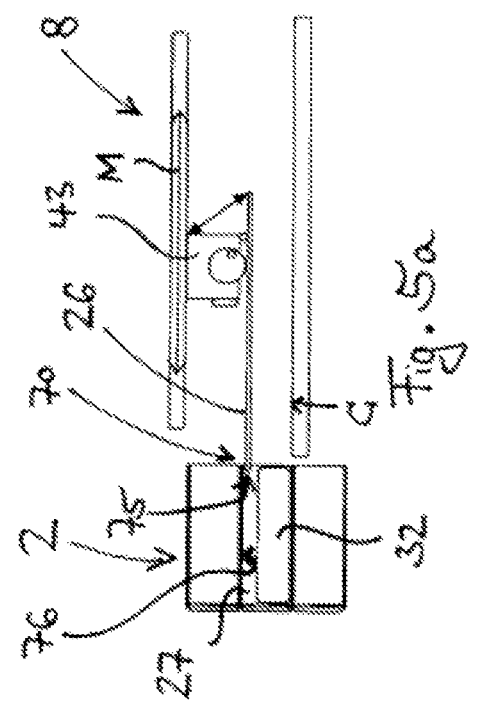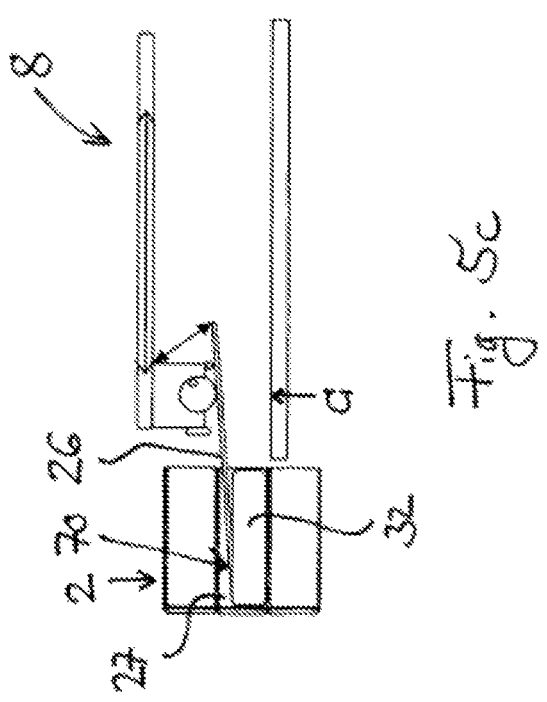

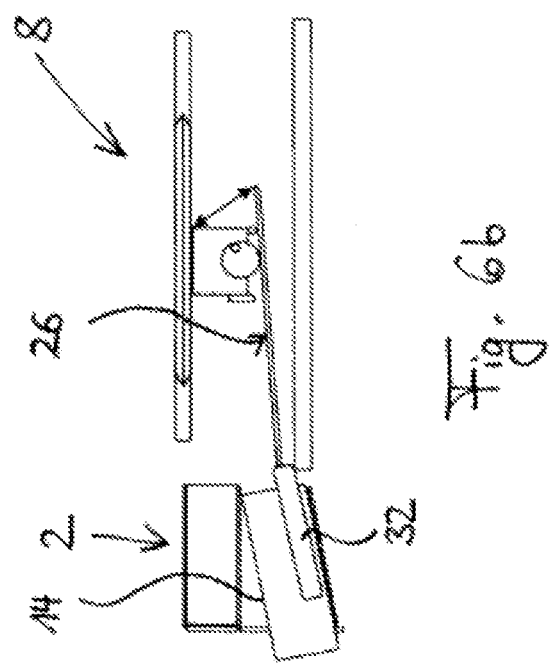
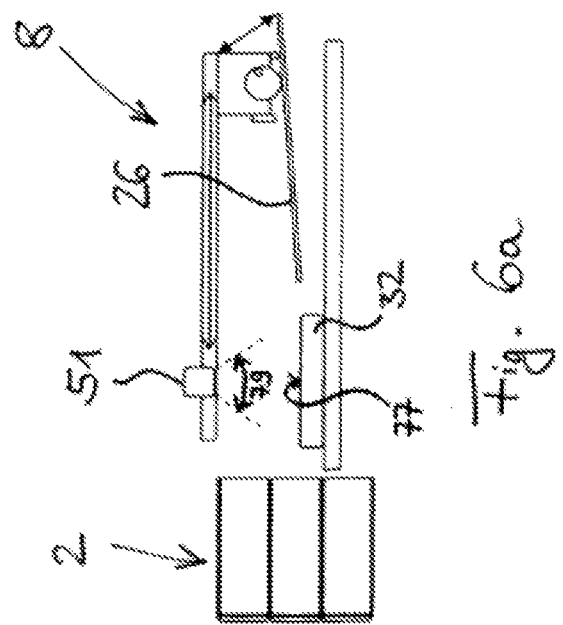

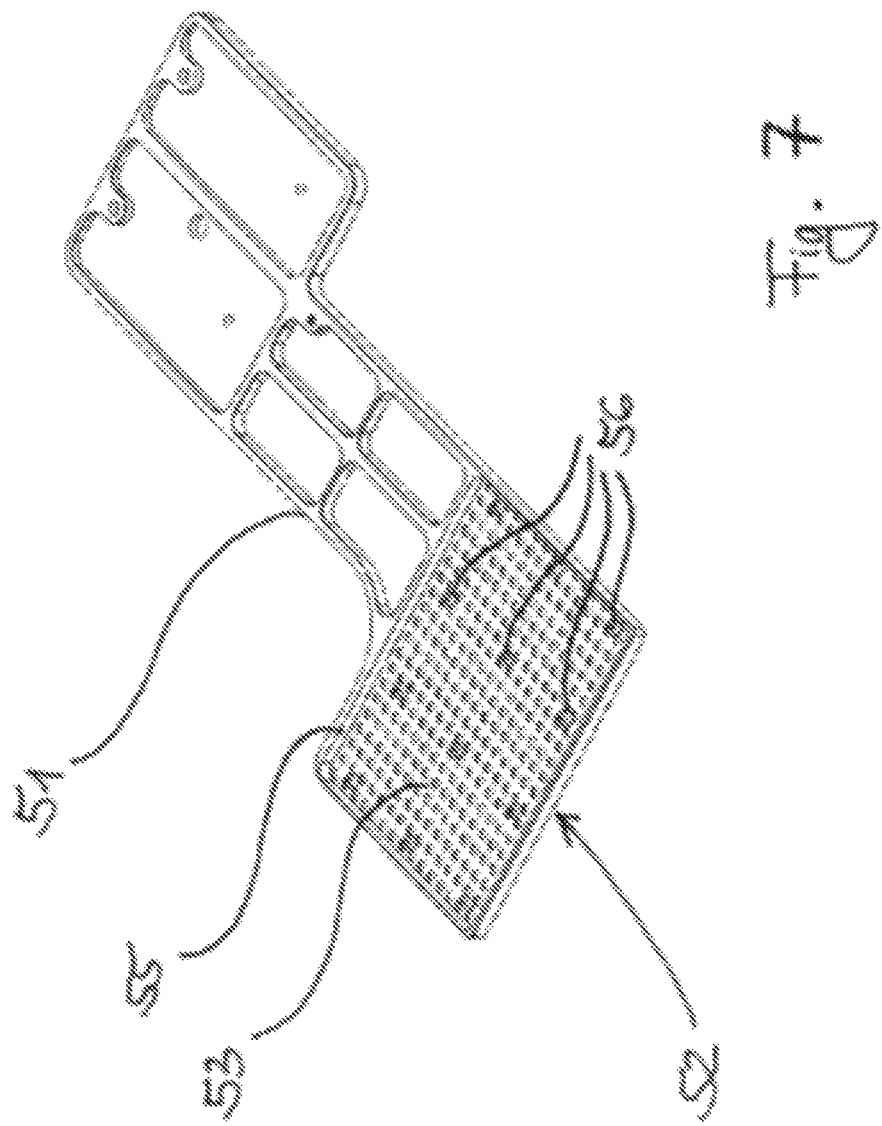

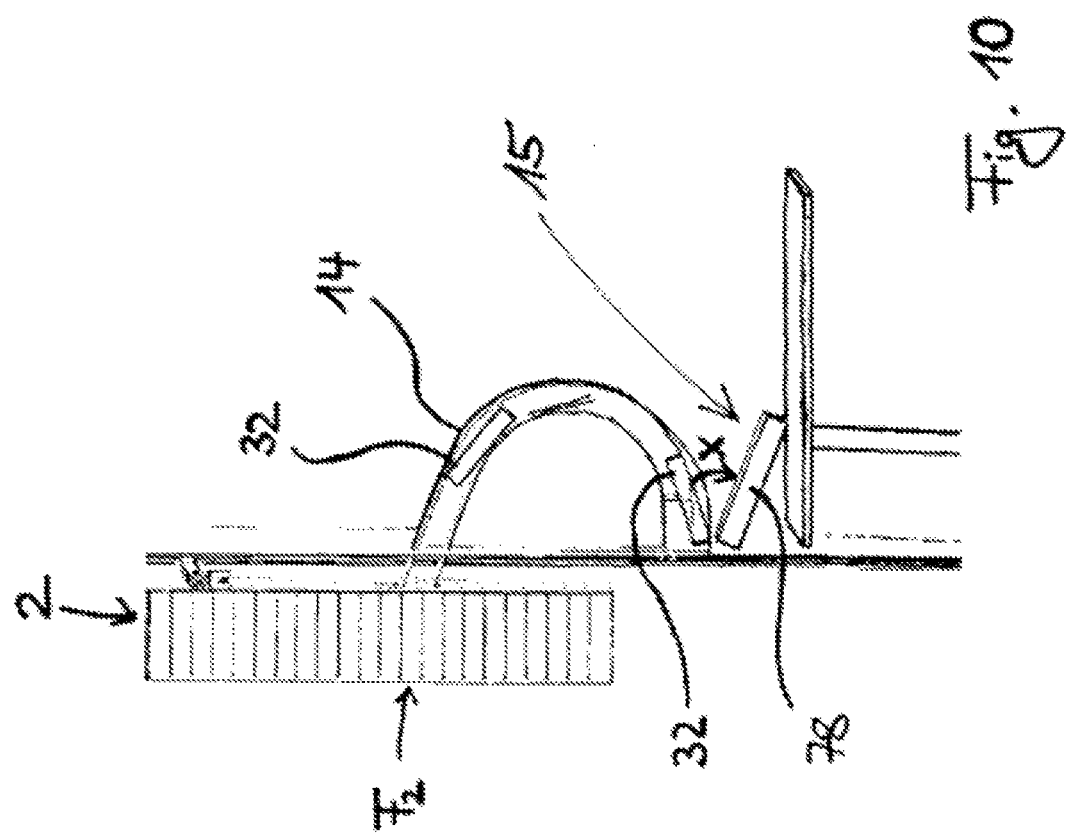

APPARATUS FOR STORING AND FULLY AUTOMATICALLY DISPENSING A MULTIPLICITY OF PRODUCTS

CROSS-REFERENCE TO RELATED APPLICATIONS

This is a continuation of PCT/EP2012/004059, filed Sep. 27, 2012, which claims priority to DE Application 10 2011 115 663.5 filed Sep. 28, 2011, the contents of each of which are incorporated by reference in their entireties.

FIELD OF THE INVENTION

The present invention relates to an apparatus for stocking and fully automatic output of a multiplicity of different products having substantially cuboid geometry, such as packaged CDs, DVDs, printer cartridges, books, etc., comprising at least one permanently installed storage rack for stocking the multiplicity of products, at least one selection station for selecting, from the multiplicity of stocked products, one product to be output by the apparatus at a product output point, at least one handling device that is movable relative to the at least one storage rack for retrieval of a selected product from the at least one storage rack and for transport of the product in question to a product output point of the apparatus, and at least one computer-assisted control unit for controlling the apparatus and its components. The present invention further relates to a handling device to be used in such an apparatus for retrieval of products from a storage rack.

BACKGROUND

Such apparatuses are known in principle from the prior art, for example in the form of vending machines, but in most cases they are suitable only for stocking and fully automatic output of a few hundred products. In principle, however, a need exists—for example in the field of goods logistics or sales outlets—for an apparatus of the type mentioned in the introduction, which advantageously can stock at least thousands, preferably even at least tens of thousands or more products at the same time and can output them completely automatically in response to an appropriate request.

A problem with already known apparatuses of the present type, however, is not only the circumstance that they usually stock only a few products and/or because of their design cannot be adapted or expanded at all or easily to a broader range of goods, but also in particular that the handling device of such apparatuses, which are usually equipped with a—more or less complicated—gripper system for picking up a product, is able to handle products with different outside dimensions only inadequately.

A further frequently occurring problem is that the products with substantially cuboid geometry addressed with the present invention, for example such as CDs, DVDs, Blu-ray disks, printer cartridges, books, etc. packaged in plastic or cardboard cases, usually also wrapped with plastic or cellophane film forming the outermost packaging layer, can be easily damaged by the gripper systems or by handling devices equipped with suction cups. A further disadvantage of apparatuses of the type mentioned in the introduction and known from the prior art is that, because of the design of their handling devices (or gripper systems or the like attached thereto), they need considerable space around the stocked product in order to grip it or otherwise pick it up, and so such apparatuses or the stocking of products taking place therein have enormous space requirements and/or are frequently configured such that not every individual product of the multiplicity of stocked products is accessible to the handling device or such that great effort must be exerted for suitable sorting of the stocks.

SUMMARY

Against this background, the object of the present invention is to provide an apparatus of the type mentioned in the introduction that has the simplest possible design and thus is inexpensive to manufacture, and that on the one hand permits stocking of a multiplicity of products in a way that saves as much space and on the other hand permits manipulation and individual output of the stocked products upon a corresponding request as reliably as possible.

This object is achieved with an apparatus of the type mentioned in the introduction by the fact a separate compartment open on the front side of the storage rack is provided in the at least one storage rack for each product and that the handling device has at least one shelf for a product to be transported with the handling device and a movable manipulator for interacting with the products, wherein the handling device and the manipulator are configured and movable in such a way that the manipulator, with a free end of flat shape, can be inserted into a compartment above a product contained in the said compartment, lowered therein and while simultaneously exerting pressure from above on the product can be retracted together therewith from the compartment, so that the product can be pulled from the compartment by means of the manipulator onto a shelf of the handling device positioned directly in front of the compartment.

The circumstance that, in the context of the present invention, each product to be stocked in the at least one storage rack is kept in a separate compartment of the (at least one) storage rack, represents a particular advantage of the present invention in conjunction with the inventive configuration of the handling device and its manipulator. The at least one storage rack of the inventive apparatus may be structured particularly simply by the fact that, for stocking of the products, it has a multiplicity of compartments open toward a front side of the storage rack, which compartments should advantageously have a compartment bottom that is as smooth as possible in order to simplify the inventively realized retrieval of the products from the compartment. Advantageously, the individual compartments of the rack or at least the bottoms thereof on which the stocked products rest are made of plastic. The manipulator of an inventive apparatus has a free end of flat configuration, with which it can be inserted in space-saving manner above a product into a compartment of the storage rack, so that, after it has been appropriately lowered inside the compartment, the product stocked in the compartment can be withdrawn from the compartment through its opening on the front side onto a suitable shelf of the handling device. The term shelf is to be understood in the broad sense here as any part of the handling device with which a product can be at least partially braced from below and thus held for the purposes of transport on or to the handling device.

To achieve the inventive fully automatic output of (specific) products, obviously the computer-assisted control unit must have a suitable memory unit in which, for each compartment of the at least one storage rack, information is saved concerning which of the total stocked products is deposited therein for the moment or whether a product is located therein at all for the moment. Furthermore, the exact location of all compartments of the at least one storage rack (or the location of their openings on the front side) must be saved in a suitable memory unit of the control unit or must be capable of being re-saved as necessary in the case of any subsequent reconfigurations of the at least one storage rack, so that the handling device can be suitably positioned in front of a specific compartment in order to deposit a product in that compartment or to retrieve a product from that compartment and so that the manipulator can be moved accordingly.

In order that the manipulator can be moved for the purpose of retrieving a product from a compartment in the manner required according to the invention, the apparatus advantageously has at least one drive unit with which the movement sequence of the manipulator required according to the invention is achieved. Advantageously, this takes place with two drive units, of which a first drive unit moves the manipulator in a substantially horizontal direction (for insertion and withdrawal of the free end of the manipulator into or out of the compartment) and a second drive unit subjects at least the free end of the manipulator to a movement containing a vertical component. During the latter movement, for example, the entire manipulator (with its free end) can move vertically and/or the manipulator can be subjected to a swiveling movement around an axis of rotation having preferably horizontal alignment, whereby the free end of the manipulator can then also be lowered inside a storage compartment onto a product resting therein, so that the pressure necessary for the retrieval process can be exerted therewith (from above) on the product.

The inventive apparatus further preferably comprises at least one, preferably two additional drive units, with which the at least one manipulator and the at least one shelf of the handling device can be moved horizontally and vertically in front of the front side of the at least one storage rack, so that the (at least one) manipulator and the (at least one) shelf can be positioned accurately in front of each individual compartment of the at least one storage rack in order to retrieve a product from the compartment in question or—using suitable means—to convey a product resting on the shelf of the handling device into the storage compartment in question.

Advantageously, the apparatus is equipped for this purpose with suitable position-sensing means, with which the exact position of the handling device in front of the at least one storage rack can be determined with the necessary accuracy. This may advantageously be an optical means for determining the position, such as suitable laser distance sensors for determining the horizontal and vertical position of the handling device in front of the storage rack, the dimensions of which or the specific distribution of its compartments are known. If the handling device with its (at least one) manipulator and the (at least one) shelf for a product to be transported therewith can be guided slidingly in horizontal direction along a first horizontally extending beam and slidingly in vertical direction along a second vertically extending beam, an appropriate scale can also be attached to the beams in question so that the handling device can determine its exact position in front of the front side of the storage rack by suitable (optical) means. For this purpose, barcode strips extending along the entire length of the respective beams can be attached thereto, on the basis of which a suitably aligned barcode reader that can be moved with the handling device can determine the exact position of the handling device.

In a first preferred improvement of the present invention, it is provided that the manipulator is equipped on the underside of its free end with an elastic, especially rubber-like or silicone-like coating and/or knobs of elastic, especially rubber-like or silicone-like material. This on the one hand serves as protection of the product to be withdrawn from the compartment of the storage rack by means of the manipulator and on the other hand ensures sufficient (static) friction between the product and the manipulator resting with pressure on the top side thereof, so that the product can be withdrawn simply and damage-free from the storage rack. Moreover, the pressure to which a product must be subjected from above against the compartment bottom for retrieval thereof can be limited to a reasonable or the absolutely necessary minimum value.

In yet another preferred improvement of the invention, it is provided that the manipulator is equipped on the underside with a perforated plate, through the holes of which elastic knobs of rubber or silicone protrude downward, wherein these knobs are advantageously molded integrally in a single level onto a silicone layer, which is disposed above the perforated plate, or which was manufactured together therewith in a molding process. Since the manipulator of an inventive apparatus must execute a large number of product-retrieval processes over its useful life, the latter of the said variants has proved advantageous compared with a silicone coating of the underside of the manipulator, since a silicone layer that has been adhesively bonded, for example, may become detached, possibly in its entirety, from the manipulator after a large number of retrieval processes, whereas in the case of a plurality of knobs protruding downward from a perforated plate it is indeed possible for individual knobs to be damaged, but then their function is taken over by other (adjoining) knobs, so that a manipulator configured with knobs extending appropriately through a perforated plate proves to be longer-lasting.

In a further preferred improvement of the present invention, it is provided that the (at least one) handling device is equipped with a plurality of shelves for products, so that a plurality of products can be transported simultaneously by means of the handling device. Hereby the time needed between product selection and product output can be shortened, for example if several products are supposed to be output at one product output point. Furthermore, any resorting processes, in which a plurality of products must be resorted within the storage rack by means of the handling device, can be accomplished more quickly.

Furthermore, it is provided in a preferred configuration of the invention that the manipulator can be moved in such a way that a product placed on a shelf of the handling device can be pushed downward from the shelf with the front edge of the free end of the manipulator, in order, for example, to push it into a compartment of the at least one storage rack located (directly) in front of the shelf or into a product output chute leading to the product output point. In this way the manipulator is used not only for retrieval of products from a compartment of the storage rack but also as an aid for pushing or conveying a product into a compartment provided for this purpose in the storage rack. In this connection, as has already been described hereinabove, the handling device is advantageously disposed to be movable horizontally and vertically in a vertical plane in front of the front side—which is also oriented vertically—of the at least one storage rack, wherein the front side of the handling device pointing toward the storage rack is at a distance of advantageously always less than 20 mm, more preferably smaller than or equal to 15 or even smaller than or equal to 10 mm, so that a product to be withdrawn from the compartment onto the shelf of the handling device or to be conveyed from the shelf into a compartment cannot fall between the handling device and the front side of the storage rack.

To ensure that the products retrieved by the handling device from a storage compartment (or to be conveyed into a storage compartment) can be automatically identified, the handling device is advantageously equipped with at least one identifying means for identification of a product accommodated on a shelf, especially at least one optical means, for example in the form of a CCD camera or of a barcode reader, or at least one RFID reader for reading RFID tags attached to the products or packaged therewith. The arrangement of such identifying means on the handling device is particularly advantageous, since hereby the number of identifying means needed for the entire apparatus can be kept as small as possible.

Such an identifying means, for example a barcode reader, can be advantageously installed permanently on the handling device above a shelf for the product, wherein it can be ensured, by suitable configuration of the manipulator or suitable arrangement of the barcode reader (or of the other optical means), that a barcode present on the top side of the product can be read or that the product can be appropriately identified by the means in question—if necessary in cooperation with the control unit. Within the scope of the present invention, it is therefore always advantageous to ensure that the—substantially cuboid—products are held in such a way inside the compartments of the at least one storage rack that a barcode printed on the product in question or attached thereto or to be applied before sorting into a compartment of the storage rack is disposed on the top side of the product. With the aid of such identifying means disposed on the handling-device side, it is possible for the control unit of an inventive apparatus to proceed as follows in order to start up the said apparatus: The individual compartments of the (at least one) storage rack are loaded manually with the products to be stocked therein, whereupon—in an identification routine to be executed fully automatically—each individual compartment of the (at least one) storage rack is approached by the handling device, the product contained therein is retrieved by means of the manipulator from the compartment onto a shelf of the handling device, where it is identified by the identifying means and then conveyed back into the compartment, whereby the product contained in each compartment can be correlated therewith in a memory unit of the control unit of the inventive apparatus. For later subsequent loading of the (at least one) storage rack, it is possible to configure a special part of the storage rack as a subsequent loading section. This subsequent loading section—which advantageously has a multiplicity of compartments—can then be subsequently loaded at certain times with new products—which are to be stocked in the at least one storage rack of the apparatus—whereupon, in a subsequent loading routine to be executed automatically at night, for example, or during other idle times of the apparatus, the individual compartments of the subsequent loading section are approached by the handling device, the product in question is retrieved by means of the manipulator from the compartment and placed on a shelf of the handling device, where it is identified and finally conveyed by means of the handling device into an empty compartment—not belonging to the subsequent loading section—of the at least one storage rack. In this regard also it proves to be advantageous when the handling device has a plurality of shelves for products, which therefore means that several products can then be transported simultaneously on corresponding shelves of the handling device. Under these conditions, for example, several products from the respective compartments can first be loaded successively from the subsequent loading section of the storage rack onto the shelves in question of the handling device and then sorted by means of the handling device into unoccupied rack compartments in another section of the at least one storage rack. Automatic resorting—again to be performed advantageously during idle times of the apparatus—of products between different compartments of the storage rack further makes sense in order, if necessary, to dispose those products that are queried more frequently in such compartments of the storage rack that are located close to the (at least) one product output point, whereas products that are queried only infrequently can be stocked in a section of a storage rack that is further removed from the at least one product output point. Appropriate resorting can then be planned by evaluating pending product queries at the at least one selection station.

It goes without saying that the control unit of an inventive apparatus is therefore advantageously set up to execute the identification, subsequent loading and resorting routines mentioned in the foregoing.

In a further preferred configuration of the invention, it is provided that the apparatus is equipped with a plurality of selection stations, to each of which a product output point is allocated. This proves to be advantageous in particular when the apparatus is provided in a sales outlet, since then a plurality of selection stations can be provided, for example, on a wall of the sales outlet, behind which storage racks and the handling device are installed out of sight of the customers, so that various customers at the various selection stations are able simultaneously to select one or more products desired by them, which products are then—upon corresponding product queries—immediately retrieved by means of the handling device from a compartment of the at least one storage rack and transported to the product output point allocated to the respective selection station. Such a selection station can be equipped, for example with a touch-sensitive screen, on which the entire products available are displayed in the conventional way or purposeful searches can be made for specific products and finally one or more products destined for output can be selected. If necessary, it is possible to allocate different selection stations to different product categories, so that, for example, exclusively books can be selected at one selection station and exclusively CDs, DVDs and/or Blu-ray disks at another selection station. Furthermore, it goes without saying that obviously various products can also be stocked repeatedly in the at least one storage rack of an inventive apparatus (e.g. the same DVD can be stocked repeatedly in various compartments), in which case it is advantageous when the control unit operates the apparatus in such a way during control thereof that the handling device, for output of the product in question, picks up that product from the plurality of identical products which is stocked in a compartment of the at least one storage rack that is as close as possible to the product output point.

Furthermore, it is advantageously provided in a preferred improvement of the invention that the apparatus is set up in such a way that a first number of the selection stations permit output of a product only when the product has been paid for by means of an IT-assisted payment process and a second number of selection stations permit the output of a product without executing a payment operation.

With this system configuration, the inventive apparatus can be arranged such that a first part of the entire selection stations present is arranged to output products within a sales outlet equipped with a cash-register area, wherein the products will still be paid for by the customer in question at a cash register, while a second part of the selection stations is disposed outside the sales outlet, so that products selected there must first be paid for before they are output at the product output point allocated to the respective output station. The IT-assisted payment process can consist, for example, of a conventional payment by means of bank or credit card or of a computer-assisted monitored cash payment (using a conventional coin insertion slot and/or a bill insertion slot). The advantage of such a system consists in the fact that customers are therefore able—during normal business hours—to have the products in question automatically output inside the sales outlet at a first selection station with associated product output point and then pay for them together with the other purchases at the cash register, while on the other hand they also have the option—for example after leaving the sales outlet or outside business hours—that they can still purchase products that are stocked in the inventive apparatus at a further output point with associated product output point.

Within the scope of the present invention, it can be further provided that the apparatus is equipped with at least two storage racks, which are oriented parallel to one another and have their front sides facing one another, each with a multiplicity of compartments, and between which precisely one handling device is disposed, wherein the handling device is equipped with at least two manipulators, of which the first serves to retrieve products from the first storage rack and a second serves to retrieve products from the second storage rack. In this connection it is further advantageous when the handling device is equipped with a plurality of shelves, of which a first shelf of the handling device is advantageously used to receive products from the first storage rack and a second shelf is used to receive products from the second storage rack.

Furthermore, it may be regarded as expedient when either the shelves or the products disposed thereon can be moved in such a way by suitable means that a product retrieved from the first storage rack by means of a first manipulator, following appropriate repositioning of the product or of the shelf supporting the product, can be pushed downward by means of the second manipulator in the direction of the second storage rack from the shelf carrying the product. On the one hand, this permits resorting of products between storage racks disposed on different sides of the handling device. On the other hand, the option then exists, assuming that a product output point is present only in the area of the two storage racks disposed on different sides of the handling device, that a product retrieved from a compartment of the other storage rack can be delivered to the product output point.

The product output point is preferably formed by a product output chute which—just as the compartments of a storage rack—has an opening facing the handling device on the handling-device side at the height of the front side of a storage rack, into which opening a product to be output by means of the apparatus—for example by means of the manipulator—can be conveyed. From there the product can advantageously be conveyed automatically—for example by virtue of gravity—to the actual product output point, where it can be received, for example, by a customer.

In a likewise preferred improvement of the invention, it can be provided that the apparatus comprises at least two storage racks oriented at an angle to one another, especially at an angle of 90°, to each of which a handling device is allocated, wherein the two handling devices can be moved into such a position adjacent to one another that a product placed on a shelf of the first or second handling device can be brought by means of a manipulator of the first or second handling device onto a shelf of the respective other handling device. Hereby it is possible to allow for various room situations, which sometimes necessitate an angled arrangement of the storage racks, and, for example, to ensure at the same time that products can be resorted between the storage racks disposed at an angle relative to one another and/or that products that are stocked in a storage rack that is accessible to only one of the two handling devices can also be output at a product output point that is possibly accessible to only the other handling device.

Furthermore, it is possible to provide in an advantageous alternative embodiment of the present invention that at least one shelf, preferably all shelves of the at least one handling device is formed by pairs of conveyor belts, each of which can run in a different direction. This is particularly advantageous when it is additionally provided that each two such conveyor belts of a handling device, which each define a support surface of the handling device in question, are directly connected to one another in such a way that a product can be transferred by suitable control of the conveyor belts from a first to a second shelf of the handling device. In particular, it is possible herewith, in a system configuration in which a handling device is disposed between two storage racks with front sides facing one another, to ensure that a product conveyed from a compartment of the first storage rack by means of a manipulator onto a first support surface (associated with the first storage rack) can be conveyed fully automatically—with appropriate control of the conveyor belts—onto the second shelf (associated with the second storage rack), from which it can then be conveyed, for example, into a compartment of the second storage rack.

In another alternative embodiment of the invention, it can be advantageously provided that the shelf is formed by rotatably mounted balls or rollers, which obviously facilitates the withdrawal of a product achieved by means of a manipulator from a compartment onto the shelf. Transport of the product from the shelf into a compartment of a storage rack or to a product output point can also be facilitated hereby, in which connection—in the case of rollers—the rollers should be advantageously rotatable around a horizontal axis of rotation oriented parallel to the front side of the at least one storage rack.

Furthermore, as already mentioned in the introduction, the present invention relates to a handling device for use in an inventive apparatus as described in the foregoing. This—in correspondence with the feature that also distinguishes the inventive apparatus—is characterized in that it has at least one shelf for a product to be transported with the handling device and a movable manipulator for interaction with the products, wherein the manipulator is configured and movable in such a way that the manipulator, with a free end of flat shape, can be inserted into a compartment of a storage rack above a product contained in the said compartment, lowered therein and while simultaneously exerting pressure from above on the product can be retracted together therewith from the compartment, so that the product can be pulled from the compartment by means of the manipulator onto a shelf of the handling device positioned directly in front of the compartment.

It goes without saying that all aspects and special improvements already mentioned in the foregoing in connection with the inventive apparatus are also applicable for the inventive handling device, and so reference is made thereto in order to avoid repetitions.

BRIEF DESCRIPTION OF THE DRAWINGS

Various exemplary embodiments of the invention will be explained in more detail hereinafter on the basis of the drawing, wherein

FIG. 3 shows a cross section through a handling device illustrated in FIG. 2

FIG. 4a-d each show a side view of a handling device for demonstration of the interaction of a manipulator with a product during transport of a product into a compartment of a storage rack, FIG. 5a-d each show a side view of a handling device for demonstration of the interaction of a manipulator with a product during retrieval of a product from a compartment of a storage rack, FIG. 6a-b each show a side view of a handling device for demonstration of further functionalities of a handling device, FIG. 7 shows a perspective view of a basic structure of a manipulator, FIG. 9 shows a perspective view of a further exemplary embodiment of an inventive apparatus and FIG. 10 shows a cross-sectional representation of an alternative configuration of a product output chute.

DETAILED DESCRIPTION

Figure 1:
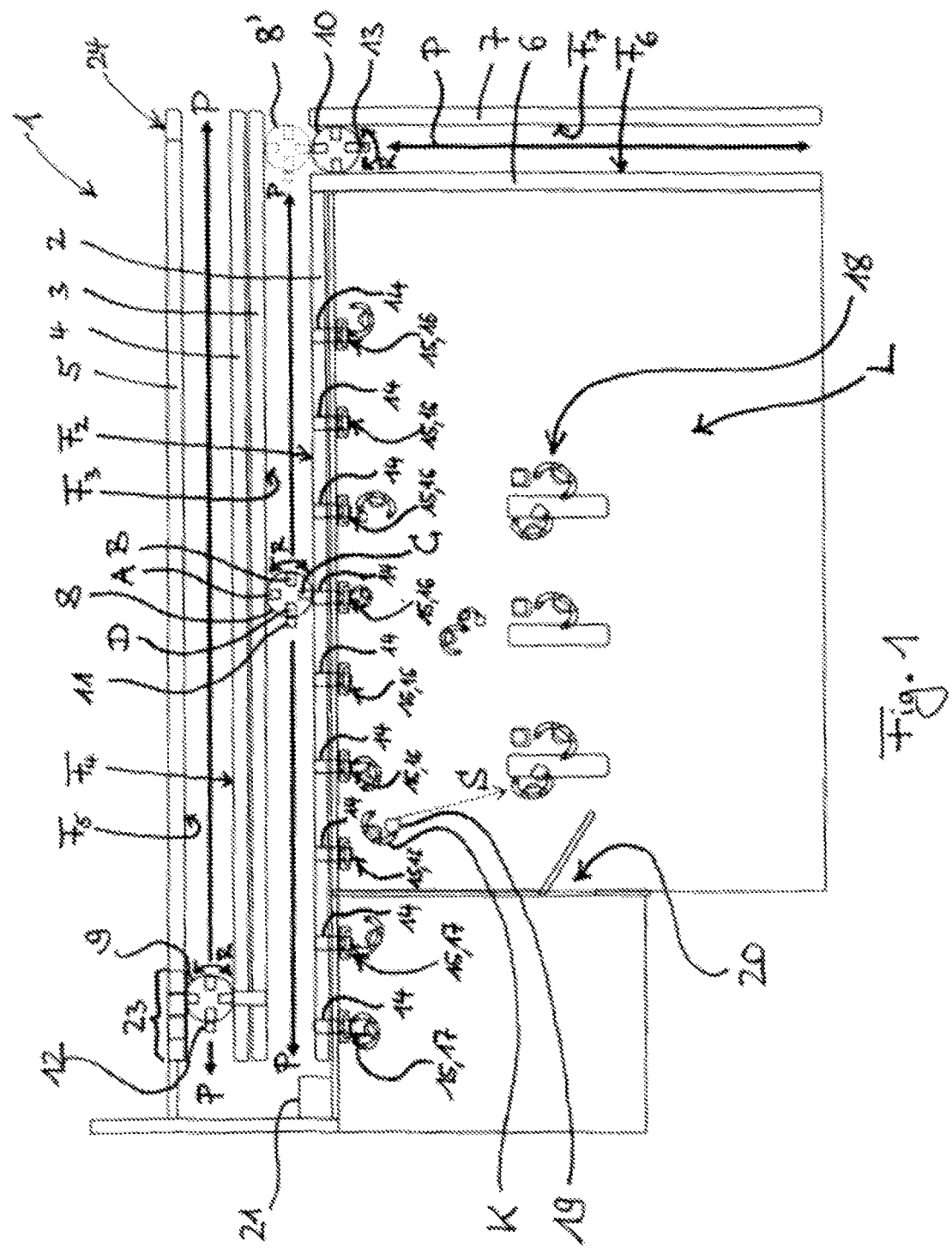
FIG. 1 shows a schematic to view of an inventive apparatus.

FIG. 1 illustrates an exemplary embodiment of an inventive apparatus 1, which is disposed adjoining a shop L (or partly inside the shop L) and for stocking of a multiplicity of products to be sold, in the present case several tens of thousands of products, and which is equipped with a total of six storage racks 2, 3, 4, 5, 6, 7 each extending over a certain length and respectively equipped with a multiplicity of compartments, not illustrated in FIG. 1.

Each pair of these storage racks 2/3, 4/5, 6/7 is permanently installed parallel to one another with front sides F2, F3, F4, F5, F6, F7 facing one another, wherein the individual compartments of storage racks 2-7 are respectively open toward the front side F2-F7 of the storage rack 2-7 in question.

Apparatus 1 also has a total of three handling devices 8, 9, 10, which are respectively disposed exactly in the middle between two storage racks 2/3, 4/5, 6/7 with front sides F2/F3, F4/F5, F6/F7 facing one another and can be moved there along double arrow P in horizontal direction and parallel to the front side of the adjoining storage racks 2/3, 4/5, 6/7, specifically together with a respective vertical beam 11, 12, 13, on which the respective handling device 8, 9, 10 is mounted to slide vertically, so that the handling device can be positioned in front of each compartment of the storage rack assigned to it by appropriate displacement in horizontal and vertical direction.

In the present exemplary embodiment, each of the handling devices 8, 9, 10 has four shelves A, B, C, D—shaped as a kind of turntable—for deposition of products to be retrieved from the compartments of the adjoining storage racks or conveyed into the compartments thereof, wherein the turntable together with the shelves A, B, C, D formed thereon is mounted to rotate according to the respective double arrow R around a vertical axis disposed approximately centrally between shelves A, B, C, D. For better clarity, the manipulators of the handling devices 8, 9, 10 used for interaction with the products, especially for retrieval thereof from a compartment of a storage rack are not illustrated in FIG. 1, although in the present case it is possible to provide exactly two such manipulators on each handling device 8, 9, 10, a first of which is used for retrieval of products from the first of the storage racks adjacent to the respective handling device and a second is used for retrieval of products from the second storage rack adjacent to the handling device.

In the orientation of shelves A, B, C, D of handling device 8 illustrated in FIG. 1, shelf A is disposed directly adjacent to front side F3 of storage rack 3 and thus is allocated to storage rack 3 in such a way that, for example by means of a first manipulator—not illustrated in FIG. 1—a product resting on shelf A is conveyed into a compartment of storage rack 3 disposed directly in front of shelf A, or a product resting inside a compartment of storage rack 3 can be pulled from the compartment onto shelf A. Correspondingly, shelf C adjacent to the opposite storage rack 2 is used for depositing products to be retrieved from a compartment of storage rack 2 or for conveying a product resting thereon into a compartment of storage rack 2, in which case, for example, a second manipulator—not illustrated in FIG. 1—of handling device 8 is used for the purpose. In the orientation of the turntable of handling device 8 illustrated in FIG. 1, the other two shelves B, D are not allocated to any of the two adjoining storage compartments, but by suitable rotation of the turntable by 90° according to arrow R can be brought into a position directly adjacent to the respective storage rack 2 or 3 where, for example, they can receive a product conveyed by means of a manipulator from a compartment. Furthermore, a product initially conveyed by means of a first manipulator from a compartment of storage rack 3 onto shelf A can—after rotation of the turntable by 180° and possibly vertical and/or horizontal displacement of the handling device—be conveyed by means of a second manipulator of handling device 8 into a specific compartment of the opposite storage rack 2 or into a product output chute 14—accessible in the region of front side F2 of storage rack 2—leading to a respective product output point 15. In the present case, in total nine such product output points 15—distributed over the length of storage rack 2—are provided, which are respectively allocated to a selection station 16, 17, in other words are disposed in spatial terms close to the selection station in question.

A first number, in the present case seven, of selection stations 16 are located inside the actual shop L just in front of cash-register area 18, so that a product 19 requested by a customer K at a selection station 16 can be output directly at product output point 15 there, without requiring a payment process at selection station 16. Customer K is able to accept product 19 and pay for it, as indicated by arrow S, in order to complete his or her purchase in shop L at a cash register of the cash-register area 18 therein, before leaving shop L via exit 20. If necessary, at least part of selection stations 16 (or the software running thereon for selection of products) is set up in such a way that different selection stations permit only the selection of a deliverable partial range of the entire available product line.

In the present case, however, a second number (namely two) of selection stations 17 are also provided outside cash-register area 18 or outside exit 20 of shop L, at which stations customers can likewise request products, which are then output, however, only after execution of an IT-assisted or IT-monitored payment process at the product output point 15 there. In this way customers are also able to purchase one or more of the products stocked in apparatus 1 outside the business hours of the shop or after they have left shop L, without having to enter it at all.

The entire apparatus 1 is controlled by means of (at least) one computer-assisted control unit 21, which ensures in particular that (at least) one product 19 selected at a selection station 16, 17 is retrieved—if necessary after completion of a payment process, in which the price allocated to the respective product was paid for by a cash or cashless transaction—completely automatically by means of the at least one handling device 8, 9, 10 from a compartment of the at least one storage rack 2-7 and transported to a product output point 15 allocated to the selection station 16, 17 in question, where it can be received by the customer operating the selection station.

However, as is precisely the case for handling device 10, which is illustrated at the right, and which—being oriented offset by 90° relative to the other four storage racks 2-5—is allocated to storage racks 6, 7, handling device 9, which is allocated to the two storage racks 4, 5 illustrated hereinabove in FIG. 1, cannot deliver a product directly to a product output chute 14, and so any transfer of a product to be output must take place onto handling device 8 allocated to storage rack 2.

This is achieved in the case of handling device 9 illustrated hereinabove in FIG. 1 by the fact that a product can be conveyed thereby into a transfer chute 22, which ends in such a way in the region of front side F3 of storage rack 3 allocated to further handling device 8 that the product in question can be picked up from there by means of a manipulator of handling device 8 and delivered from there by means of handling device 8 to product output chute 14 allocated to product output point 15. In the case of handling device 10 illustrated at the right in FIG. 1, it is provided that handling device 10 and handling device 8 can be brought into an adjacent position (see position 8' of handling device 8 illustrated in broken lines) in such a way that a product resting on a shelf of handling device 10 can be transferred (for example by means of a manipulator of one of the two handling devices 8, 10) onto a suitably positioned shelf of handling device 8 and thus delivered by means of handling device 8 to product output chute 14.

Storage rack 5 of apparatus 1 is further equipped with a subsequent loading section 23, which in turn has a suitable plurality of compartments, wherein these compartments can be loaded manually with further products for subsequent loading of the at least one storage rack 2-7. In a subsequent loading routine, these products are then successively retrieved from subsequent loading section 23 by means of handling device 9 and then—by means of the at least one handling device 8, 9, 10—conveyed into suitable compartments of the at least one storage rack 2-7, in which case product transfer takes place if necessary between the different handling devices. The products in question can be identified by suitable identifying means provided on at least one, preferably on all handling devices 8, 9, 10 (for example, by a barcode reader disposed above at least one shelf of a handling device), so that an unambiguous correlation of where within apparatus 1 a given product is located for the moment. During manual initial loading of the compartments of storage racks 2-7 with products, the handling device 8-10 allocated to the respective storage rack can be brought up successively to each compartment of the storage rack 2-7 in question in an initial loading routine, then the product contained therein can be identified and then conveyed back into the compartment, and so, after manual initial loading of the storage racks, which can be performed rapidly (and in which there is no need to record which product is placed in which compartment), it is possible in simple manner to determine and save which product is stocked in which compartment of the various storage racks.

Products which—for whatever reason—cannot be identified by the identifying means of a handling device, can be advantageously sorted out by delivering them automatically to an output chute 24, where they can be received by the operating personnel and, for example, provided at a suitable station with a legible barcode and then if necessary sorted into a compartment of subsequent loading section 23 once again. It is advantageous when the compartments of subsequent loading section 23 can also be accessed from behind, i.e. from the side of storage rack 5 remote from front side F5, since then apparatus 1 can be subsequently loaded with new products without the need for an operating person to enter the area between the storage racks (in which the handling devices are being moved).

Figure 2:
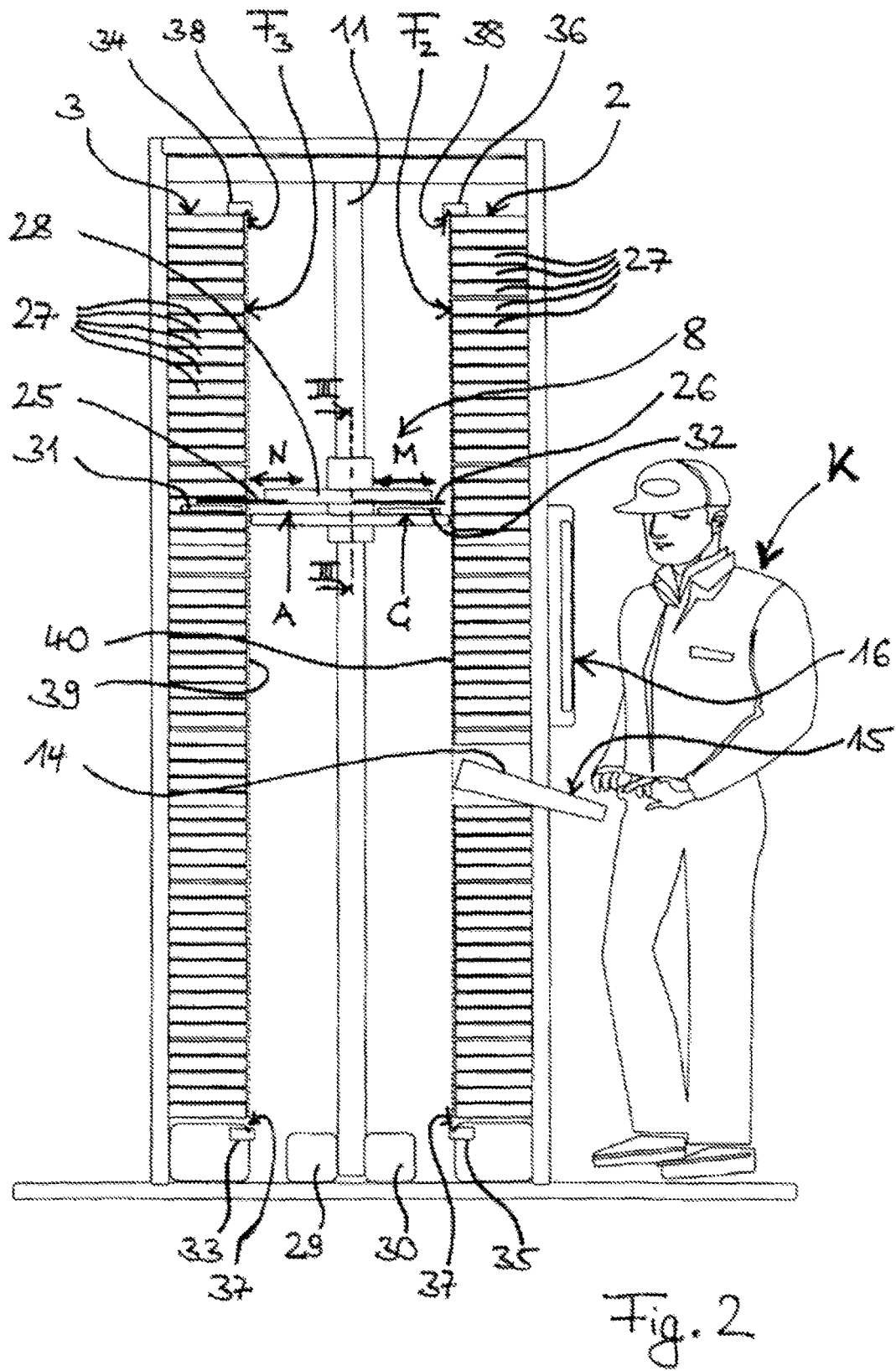
FIG. 2 shows a cross section through a part of the apparatus shown in FIG. 1.

FIG. 2 shows a cross section through the two storage racks 2, 3 and handling device 8 from FIG. 1, wherein the section passes through the area of a selection station 16, which can be operated by a customer K and to which a product output point 15 is allocated. In this connection it can be clearly recognized that each of the two storage racks 2, 3 is subdivided in vertical direction into a plurality of individual compartments 27, in each of which a—substantially cuboid—product 31, 32, such as, for example, a conventionally packaged CD or DVD, can be accommodated. FIG. 2 also shows the two manipulators 25, 26 of handling device 8, of which manipulator 25 illustrated on the left is used in particular to retrieve products from compartments 27 of storage rack 3 located on the left of handling device 8 and manipulator 26 illustrated on the right is used in particular to retrieve products from compartments 27 of storage rack 2 illustrated on the right. Otherwise it goes without saying that, within the scope of the present invention, not all compartments 27 necessarily have the same dimensions, but instead that compartments 27, possibly having various heights and/or various widths, may be provided for stocking of different products. However, each compartment 27 should be sufficiently high (and wide) that it is suitable for accommodating the products to be stocked in apparatus 1 and that for this purpose the free end of manipulator 25, 26 of the associated handling device 8-10 can still always be inserted into compartment 27 in question above a product 31, 32 resting therein. FIG. 2 shows manipulator 25 illustrated on the left in a position in which the free end thereof with flat shape and a height of only approximately 10 mm in the present case has already been inserted into a compartment of storage rack 3 in which a product 31 is stocked, such that it is above product 31. In the present case, manipulator 26 illustrated on the right is disposed in a home position above product 32 resting on shelf C of handling device 8.

To achieve the inventive functionality, manipulators 25, 26 are mounted to move on a mounting structure 28 in such a way that their free end facing the respective storage rack 2, 3 can be inserted into a compartment 27 and withdrawn again from compartment 27—above a product—in horizontal direction as shown by double arrows N, M. Furthermore, both manipulators 25, 26 or the respective free end thereof can also be moved or swiveled in vertical direction, so that they can be brought into contact from above while exerting a certain pressure onto a product 31 placed inside a compartment 27, whereupon they can then be withdrawn again in horizontal direction from the compartment of the storage rack 2, 3 in question together with product 31. The product withdrawn in such a way from the compartment of storage rack 2, 3 is pulled directly onto a shelf A or C of the handling device positioned directly in front of the respective compartment, so that it comes to rest there before being transported—together with handling device 8, which can be moved horizontally and vertically as a whole on beams 11, 29, 30—to another point inside apparatus 1.

Furthermore, FIG. 2 also shows a product output chute 14, which is open toward front side F2 of storage rack 2, and into which a product can be conveyed by means of handling device 8—just as into another compartment 27 of the storage rack—whereupon it slides toward product output point 15, which is accessible for customer K.

Since handling devices 8, 9, 10 illustrated in FIGS. 1 and 2, together with their four shelves A, B, C, D respectively disposed on a kind of turntable for products to be accommodated thereon, are always disposed in the present case directly adjacent to adjoining storage racks 2-7, each with a spacing of only a few millimeters or at most approximately 2 centimeters and in this connection are also moved vertically and horizontally in front of the respective storage racks, a product that may be protruding from a compartment of a storage rack 2-7 on its front side F2-F7 may be responsible for damage to the storage rack 2-7 in question and/or the handling device 8, 9, 10 if the handling device 8, 9, 10 in question collides with the product—in passing, as it were—and jams it against a wall of the respective compartment. To prevent this, it must be ensured on the one hand that products being conveyed by a handling device 8, 9, 10 (or by a manipulator 25, 26 of handling device 8, 9, 10 in question) into the compartment in question are inserted reliably far into the respective compartment and do not rebound there—for example against the closed rear side of the compartment in question—back to the front again. On the other hand, damage to apparatus 1 can be advantageously prevented with a safety device, which reliably detects a product protruding from a compartment of the at least one storage rack 2-7 and then ensures a safety shutdown, for example, of apparatus 1. This can be achieved, for example, by means of LEDs appropriately disposed and aligned on the top and bottom sides in the region of front side F2-F7 of storage racks 2-7 and corresponding optical sensors (diodes) which, when a kind of light curtain 39, 40 is provided directly in front of the front sides of the storage racks, can detect a product protruding from a rack compartment by the fact that at least one of the light beams is interrupted by the protruding product. For this purpose a strip 33, 34, 35, 36 containing LEDs 37 or optical sensors 38 is mounted on the top and bottom sides of the storage racks, as illustrated in FIG. 2. In this connection, a multiplicity of LEDs and sensors are advantageously disposed over the length of storage racks 2, 3, for example at a spacing of a few centimeters each.

FIG. 3 shows a section through handling device 8 of FIG. 2 along the section line III-III therein, in other words in a plane disposed parallel to front sides F2 and F3 of storage racks 2, 3.

Manipulator 26, which at its underside—especially in the region of its free end—has a knob-like structure 41 of silicone, is mounted on a mounting structure 28 and can be moved in horizontal direction, i.e. perpendicular to the drawing plane of FIG. 3, by means of a first electrical drive motor 42. Furthermore, manipulator 26 can be swiveled in a rear region around a horizontal axis H, so that its free end can be lowered and then raised again in vertical direction, for which purpose an electrical drive motor 43 is likewise provided. Manipulator 28 itself—together with its free end—has flat shape on the whole and in the present case has a height h of only 12 mm.

FIG. 3 further shows two of the total of four shelves B, D of handling device 8, which in the present case can be rotated, by means of a further drive motor 44, around a central axis of rotation Z of the turntable-like structure 45. The two shelves B, D—just as also the two further shelves A, C, which are not visible in FIG. 3—are formed by a plurality of freely rotatable rollers 46, (or rollers that can be released at a given instant), on which products 32, 47, 48—assuming appropriate positioning of the respective shelf—are able to slide easily in a direction perpendicular to the front side of an adjoining storage rack, in order that—by means of a manipulator 25, 26—they can either be easily pushed into a compartment of the storage rack or easily pulled therefrom onto the respective shelf. Each shelf A, B, C, D is bounded laterally on both sides by guide plates 49, 50, in order to prevent a product 32, 47, 48 resting on a shelf from slipping sideways. Furthermore, a barcode scanner 51 is disposed above shelf A, which in FIG. 3 is behind the plane of the drawing and on which product 32 rests, in order to identify product 32 from above by reading a barcode applied on its top side (for example, a 1-dimensional or 2-dimensional barcode).

Handling device 8 as a whole is fastened on beam 11 such that it can be moved vertically in the direction of double arrow T.

FIGS. 4a-4d each illustrate, in a (schematic) side view of a section of a handling device 8, the mode of operation of a manipulator 26 in interaction with a product 32, and specifically in connection with an option for conveying product 32 from a shelf C into a compartment 27 of a storage rack 2, which is illustrated only partly.

FIG. 4a shows handling device 8 equipped with a shelf C in a position in which shelf C is positioned directly in front of a compartment 27 of storage rack 2, i.e. at a short distance of, for example, approximately 8-10 mm. In order to push product 32 resting on shelf C into compartment 27 of storage rack 2 by means of manipulator 26, manipulator 26 was first brought into the position shown in FIG. 4a in which front edge 75 of free end 70 of manipulator 26—looking toward storage rack 2—is disposed behind product 32 and just above the level of shelf C.

For this purpose, manipulator 26 of handling device 8 can be moved on its mounting structure 28—by means of a first drive unit, not illustrated in FIGS. 4a-4d—in horizontal direction according to double arrow M perpendicular to front side F2 of storage rack 2, so that it can assume the position shown in FIG. 4a behind product 32. For adjustment of the height of free end 70 of manipulator 26 above shelf C, free end 70 can be moved in vertical direction according to double arrow V by means of a drive unit 43, which causes tilting of manipulator 26.

Starting from the position shown in FIG. 4a, manipulator 26 can then be moved horizontally in the direction of storage rack 2, whereby product 32 is pushed successively into compartment 27 of storage rack 2, as is shown in the further FIGS. 4b and 4c.

As soon as product 32 has been pushed completely into compartment 27 of storage rack 2, manipulator 26—by horizontal movement—can be withdrawn again, in order to assume the home position illustrated in FIG. 4d. By means of a light curtain 40, formed for example by LEDs or laser diodes, it is possible to check that product 32 does not protrude more than is permissible from the front side of compartment 27.

FIGS. 5*a*-5*d* each illustrate, in a (schematic) side view of a section of a handling device 8, a further mode of operation of manipulator 26 in interaction with a product 32, and specifically in connection with the retrieval of a product 32 from a compartment 27 of a storage rack 2 in the manner to be achieved according to the invention.

For this purpose handling device 8 and manipulator 26 of the handling device are first brought—by means of the positioning mechanism already explained in the foregoing—into the position shown in FIG. 5*a*, in which front edge 75 of free end 70 of manipulator 26 extends (slightly) into compartment 27 in an upper zone thereof. If necessary, this free end 70 of manipulator 26—by suitable vertical positioning—can be aligned precisely along the upper wall or top 76 of compartment 27, by bringing it into contact therewith from underneath.

Manipulator 26 is then moved horizontally in the direction of storage rack 2, until its free end 70 is disposed above product 32 in compartment 27, as is illustrated in FIG. 5*b*.

Then free end 70, provided on the underside with a silicone coating or silicone knobs, is lowered vertically—in the present case by appropriate tilting of manipulator 26—inside rack compartment 27 until it comes into contact with product 32 with a certain (spring) pressure from above (see FIG. 5*c*), whereupon manipulator 26 together with product 32 can then be withdrawn from compartment 27 by horizontal movement, so that product 32 is pulled onto shelf C for product 32 positioned directly in front of compartment 27.

FIG. 6*a* schematically shows the identification of a product 32 resting on shelf C by means of a barcode reader 51 disposed above shelf C for reading a barcode disposed on top side 77 of the product, for which purpose manipulator 26—as illustrated in FIG. 6*a*—is advantageously moved into a position in which visible area 79 of barcode reader 51 is not covered.

FIG. 6*b* illustrates further that a product 32 can be conveyed or pushed by means of manipulator 26 of handling device 8 into a product output chute 14, and specifically in the same way as has already been shown in FIGS. 4*a*-4*d* for conveying a product into a compartment 27 of storage rack 2.

FIG. 7 shows a perspective view of a detail of basic structure 51 of a manipulator 25, 26, which in an end region 52 is formed by a perforated plate 53. This perforated plate 53 forms the underside of the free end of a manipulator 25, 25, wherein knobs of a rubber-like or silicone-like material protrude downward through holes of the perforated plate. This can be achieved by introducing at least the end region 52 of basic structure 51 into a casting mold, which forms the lower negative mold for the knobs that will protrude through the holes of the perforated plate. Thereafter the part of basic structure 51 bounded by rim 55 can be filled with silicone-like or rubber-like casting compound, so that a layer of rubber-like or silicone-like material, onto which the knobs are integrally molded, is formed above perforated plate 53. The knobs are able to protrude downward though the holes of the perforated plate by, for example 3-5 mm. To complete the manipulator, a top cover—not shown in FIG. 7—can then be mounted by screws in threads 56 provided for the purpose in the region of perforated plate 53, thus bracing the silicone layer from above.

Figure 8:
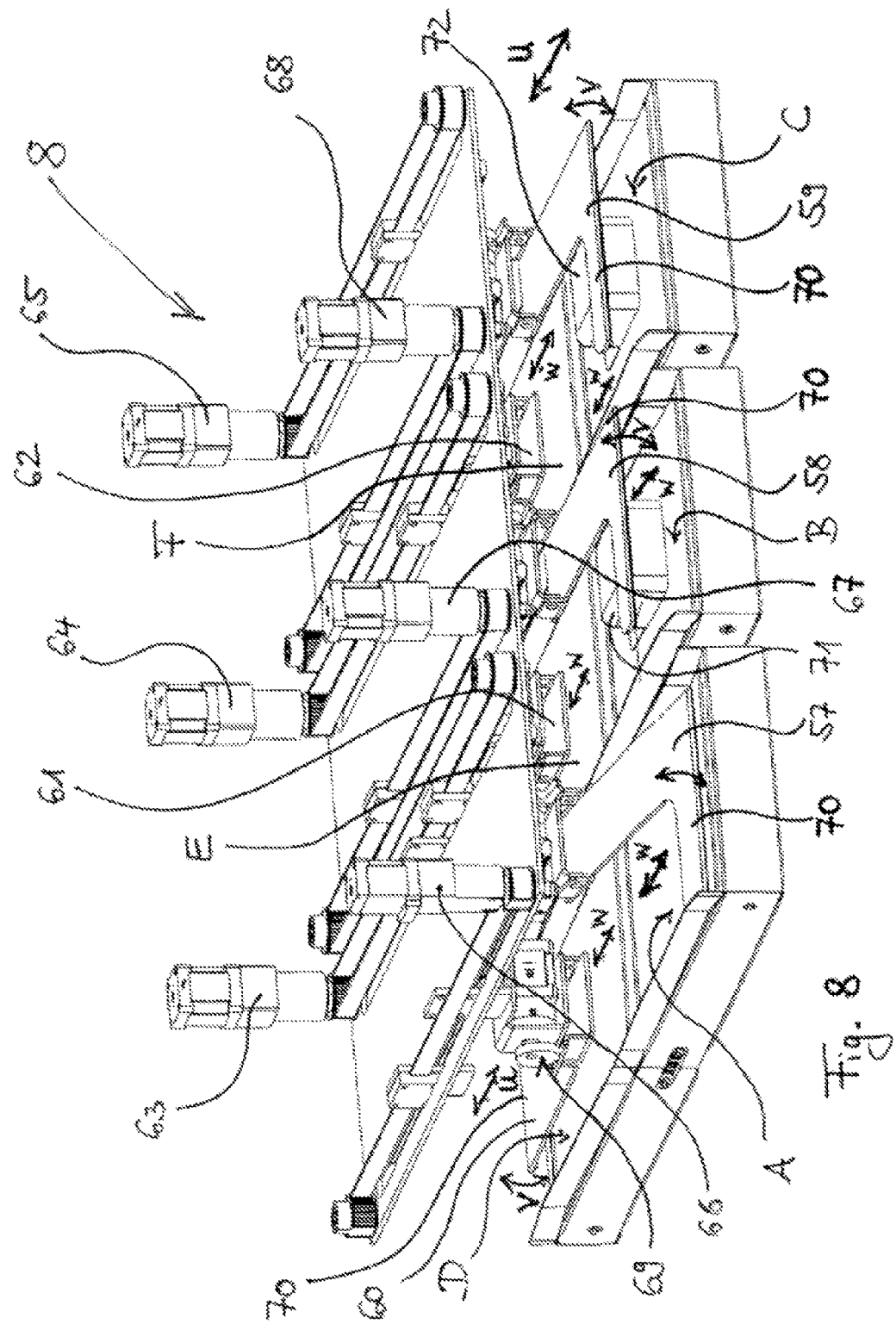
FIG. 8 shows a view of an alternative configuration of a handling device for use in an inventive apparatus.

FIG. 8 shows an alternative design of a handling device 8, which in the present case provides a total of six shelves A-E for products to be transported thereon, wherein each shelf A-E is assigned its own manipulator 57-62, which can be moved in horizontal direction according to double arrow U by means of a first drive unit 63-68 respectively, so that it can be inserted into or retracted from a compartment of a storage rack disposed directly in front of a shelf A-F. Furthermore, each manipulator 57-62 can be tilted or swiveled by means of a second drive unit 69, only one of which is illustrated for perspective reasons, in such a way that free end 70 of each manipulator executes a substantially vertical swiveling movement according to double arrow V.

Handling device 8 illustrated in FIG. 8 is disposed and guided between two storage racks in such a way that each three shelves A/B/C and D/E/F disposed next to one another are always positioned directly in front of the front side of a storage rack, at a small distance therefrom. Each of these shelves A-F is formed by a conveyor belt that can be moved—according to double arrow W—in two opposite directions, so that products 71, 72 resting on a shelf A-F can be moved by means of the respective conveyor belt in a direction perpendicular to the front side of an adjoining rack, whereby the retrieval of a product from a compartment of the storage rack is assisted and the transport of a product into a compartment of a storage rack (or into a product output chute) can even be achieved or also assisted.

Shelves A/D, B/E, C/F respectively are connected to one another in transport direction of the conveyor belts in such a way that a product can be transferred from one shelf onto a shelf connected thereto by suitable control of the conveyor belts.

Figure 9:
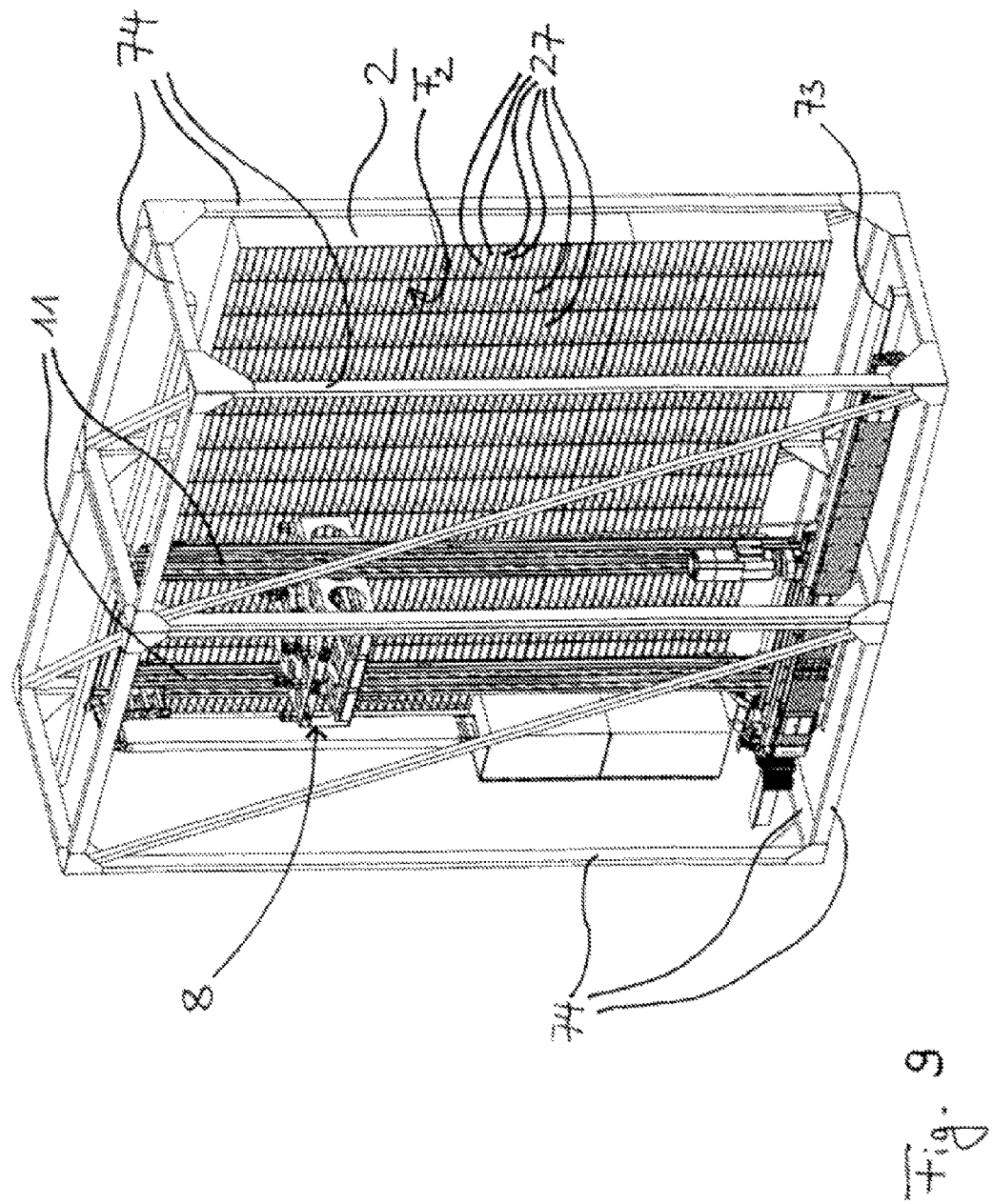

FIG. 9 shows a three-dimensional representation of a section of an inventive apparatus 1 with a handling device 8 (according to the exemplary embodiment from FIG. 8) and a storage rack 2. Handling device 8 is actually guided in vertically movable relationship on two vertical beams 11 between two storage racks with front sides facing one another, wherein only a first storage rack 2 is illustrated for the sake of better clarity. Furthermore, handling device 8, together with the two vertical beams in front of front side F2 of storage rack 2, is also guided in horizontally movable relationship on a horizontal beam 73, so that the handling device can be suitably positioned with at least one shelf A-F in front of each compartment 27 of storage rack 2. Not only the storage rack or racks 2 but also the vertical and horizontal beams 11, 73 are mounted—directly or indirectly—on a frame-like basic structure 74, which permits or facilitates the fixed mounting of storage racks 2 and positioning of handling device 8 that is always accurate for this purpose.

Finally, FIG. 10 shows, in a sectional diagram, an alternative design of a product output chute 14, which in this case is bow-shaped, and in which product 32, transported by means of a handling device from a front side F2 of storage rack 2 into product output chute 14 and sliding therein, is reoriented in such a way that, at the end of the bow-shaped portion, the previously lower side of the product faces upward, so that product 32, after it has been tipped according to arrow X onto a ramp 78 leading to product output point 15, faces upward there with that side which had formed the underside of product 32 inside the apparatus. This is advantageous in particular in the case of use of barcode readers for product identification inside the apparatus, since products to be stocked according to the invention, such as, for example, packaged CDs, DVDs, books, etc. are usually marked with the barcode on the rear side of the product, so that the products must be stocked and handled inside the apparatus with the rear side facing up. By means of product output chute 14 shown in FIG. 10, the product can then be output in such a way at product output point 15 that the customer is able to receive it with the front side of the product facing up.

I claim:
1. An apparatus (1) for stocking and fully automatic output of a multiplicity of different products (19, 31, 32, 71, 72) having substantially cuboid geometry, comprising:
at least one permanently installed storage rack (2, 3, 4, 5, 6, 7) for stocking the multiplicity of products (19, 31, 32, 71, 72),
at least one selection station (16, 17) for selecting, from the multiplicity of stocked products (19, 31, 32, 71, 72), one product of the multiplicity of products (19, 31, 32, 71, 72) to be output by the apparatus (1) at a product output point (15),
at least one handling device (8, 9, 10) that is movable relative to the at least one storage rack (2, 3, 4, 5, 6, 7) for retrieval of a selected product of the multiplicity of products (19, 31, 32, 71, 72) from the at least one storage rack (2, 3, 4, 5, 6, 7) and for transport of the selected product (19, 31, 32, 71, 72) to the product output point (15) of the apparatus (1) and
at least one computer-assisted control unit (21) for controlling the apparatus (1) and its components,
wherein a separate compartment of a plurality of separate compartments (27) open on a front side (F2, F3, F4, F5, F6, F7) of the storage rack (2, 3, 4, 5, 6, 7) is provided in the at least one storage rack (2, 3, 4, 5, 6, 7) for each product of the multiplicity of products (19, 31, 32, 71, 72) and in that the at least one handling device (8) has at least one shelf (A, B, C, D, E, F) for a product of the multiplicity of products (19, 31, 32, 71, 72) to be transported with the handling device (8, 9, 10) and a movable first manipulator (25, 26; 57-62) for interacting with the multiplicity of products (19, 31, 32, 71, 72),
wherein the at least one handling device (8, 9, 10) and the first manipulator (25, 26; 57-62) are configured and movable in such a way that the first manipulator (25, 26; 57-62), with a free end (70) of flat shape, can be inserted into a compartment of the separate compartments (27) above a product of the multiplicity of products (19, 31, 32, 71, 72) contained in the said compartment (27), lowered therein and while simultaneously exerting pressure from above on the product (19, 31, 32, 71, 72) can be retracted together therewith from the compartment (27), so that the product (19, 31, 32, 71, 72) can be pulled from the compartment (27) by means of the first manipulator (25, 26; 57-62) onto the at least one shelf (A, B, C, D, E, F) of the handling device (8, 9, 10) positioned directly in front of the compartment (27),
wherein the apparatus (1) is equipped with at least two storage racks (2/3; 4/5; 6/7), which are oriented parallel to one another and have their front sides (F2, F3, F4, F5, F6, F7) facing one another, each with a multiplicity of compartments of the plurality of separate compartments (27), and between which precisely one of the at least one handling device (8, 9, 10) is disposed, wherein the handling device (8, 9, 10) is equipped with at least one additional manipulator (25, 26; 57-62), and wherein the first manipulator (26; 57, 58, 59) serves to retrieve products of the plurality of products (19, 31, 32, 71, 72) from a first storage rack of the at least two storage racks (2, 4, 6) and the at least one additional manipulator (26; 61, 62, 63) serves to retrieve products of the plurality of products (19, 31, 32, 71, 72) from a second storage rack of the at least two storage racks (3, 5, 7), and
wherein a first shelf (C) of the at least one shelf of the handling device (8, 9, 10) is used to receive products of the plurality of products (19, 31, 32, 71, 72) from the first storage rack (2, 4, 6) and a second shelf (A) of the at least one shelf is used to receive products of the plurality of products (19, 31, 32, 71, 72) from the second storage rack (3, 5, 7), wherein either the shelves (A, B) or the products (19, 31, 32, 71, 72) disposed thereon can be moved in such a way by suitable means that a product of the plurality of products (19, 31, 32, 71, 72) retrieved from the first storage rack (2, 4, 6) by means of the first manipulator (26), following appropriate repositioning of the product (19, 31, 32, 71, 72) or of a shelf of the at least one shelf (A, B) supporting the product (19, 31, 32, 71, 72), can be pushed downward by means of the at least one additional manipulator (25) in the direction of the second storage rack (3, 5, 7) from the shelf (A, B) of the at least one shelf carrying the product (19, 31, 32, 71, 72).

2. The apparatus of claim 1, wherein each manipulator (25, 26; 57-62) is equipped on the underside of its free end (70) with an elastic, especially rubber-like or silicone-like coating and/or knobs (41) of elastic, especially rubber-like or silicone-like material.

3. The apparatus of claim 2, wherein each manipulator (25, 26; 57-62) is equipped on the underside with a perforated place (53), through the holes of which elastic knobs (41) of rubber or silicone protrude downward.

4. The apparatus of claim 1 wherein the handling device (8, 9, 10) is equipped with a plurality of said at least one shelf (A, B, C, D, E, F) for products of the plurality of products (19, 31, 32, 71, 72), so that multiple products of the plurality of products (19, 31, 32, 71, 72) can be transported simultaneously by means of the handling device (8, 9, 10).

5. The apparatus of claim 4, wherein each manipulator (25, 26; 57-62) can be moved in such a way that a product of the plurality of products (19, 31, 32, 71, 72) placed on a shelf of said at least one shelf (A, B, C, D, E, F) of the handling device (8, 9, 10) can be pushed downward from the shelf (A, B, C, D, E, F) with the front edge (75) of the free end (70) of the manipulator (25, 26; 57-62), in order to push it into a compartment (27) of said compartments of the at least two storage racks (2, 3, 4, 5, 6, 7) located in front of the shelf (A, B, C, D, E, F) or into a product output chute (14) leading to the product output point (15).

6. The apparatus of claim 1, wherein the handling device (8, 9, 10) is equipped with at least one identifying means (5) for identification of a product of the plurality of products (19, 31, 32, 71, 72) accommodated on a shelf (A, B, C, D, E, F) of said at least one shelf.

7. The apparatus of claim 1, wherein the apparatus (1) is equipped with a plurality of selection stations (16, 17), to each of which a product output point (15) is allocated.

8. The apparatus of claim 7, wherein the apparatus (1) is set up in such a way that a first number of the selection stations (17) permit output of a product of the plurality of products (19, 31, 32, 71, 72) only when the product (19, 31, 32, 71, 72) has been paid for by means of an IT-assisted payment process and a second number of selection stations (16) permit the output of a product of the plurality of products (19, 31, 32, 71, 72) without executing a payment operation.

9. The apparatus of claim 1, wherein the apparatus (1) comprises the at least two storage racks (2, 3 or 6, 7) oriented at an angle to one another, especially at an angle of 90°, to each of which a handling device (8, 10) of said at least one handling device is allocated, wherein two handling devices (8, 10) can be moved into such a position adjacent to one another that a product of the plurality of products (19, 31, 32, 71, 72) placed on a shelf (A, B, C, D) of said at least one shelf of a first or second handling device (8, 10) can be brought by means of a manipulator (25, 26; 57-62) of the manipulators of the first or second handling device (8, 10) of said two handling devices onto a shelf (A, B, C, D) of said at least one shelf of the respective other handling device (8, 10).

10. The apparatus of claim 1, wherein at least one shelf, preferably all shelves (A-F) of the at least one handling device (8) is formed by pairs of conveyor belts, each of which can run in a different direction.

11. The apparatus of claim 1, wherein two conveyor belts of each handling device (8), which each define a support surface (A-F) of the handling device (8) in question, are directly connected to one another in such a way that a product of the plurality of products (19, 31, 32, 71, 72) can be transferred by suitable control of the conveyor belts from one shelf to another shelf (A/D, B/E, C/F) of the at least one shelf of the handling device (8).

12. The apparatus of claim 1, wherein the shelf (A, B, C, D) is formed by rotatably mounted balls or rollers (46).

13. The apparatus of claim 1, wherein each of the multiplicity of different products are selected from the group consisting of:
packaged CDs,
packaged DVDs,
printer cartridges, and
books.

14. An apparatus (1) for stocking and fully automatic output of a multiplicity of different products (19, 31, 32, 71, 72) having substantially cuboid geometry, comprising:
at least one permanently installed storage rack (2, 3, 4, 5, 6, 7) for stocking the multiplicity of products (19, 31, 32, 71, 72),
at least one selection station (16, 17) for selecting, from the multiplicity of stocked products (19, 31, 32, 71, 72), one product of the multiplicity of products (19, 31, 32, 71, 72) to be output by the apparatus (1) at a product output point (15),
at least one handling device (8, 9, 10) that is movable relative to the at least one storage rack (2, 3, 4, 5, 6, 7) for retrieval of a selected product of the multiplicity of products (19, 31, 32, 71, 72) from the at least one storage rack (2, 3, 4, 5, 6, 7) and for transport of the selected product (19, 31, 32, 71, 72) to the product output point (15) of the apparatus (1) and
at least one computer-assisted control unit (21) for controlling the apparatus (1) and its components,
wherein a separate compartment (27) of a plurality of separate compartments open on a front side (F2, F3, F4, F5, F6, F7) of the at least one storage rack (2, 3, 4, 5, 6, 7) is provided in the at least one storage rack (2, 3, 4, 5, 6, 7) for each product of the multiplicity of products (19, 31, 32, 71, 72) and in that at least one handling device (8) has at least one shelf (A, B, C, D, E, F) for a product of the multiplicity of products (19, 31, 32, 71, 72) to be transported with the handling device (8, 9, 10) and a movable manipulator (25, 26; 57-62) for interacting with the multiplicity of products (19, 31, 32, 71, 72),
wherein the at least one handling device (8, 9, 10) and the manipulator (25, 26; 57-62) are configured and movable in such a way that the manipulator (25, 26; 57-62), with a free end (70) of flat shape, can be inserted into a compartment of the separate compartments (27) above a product of the multiplicity of products (19, 31, 32, 71, 72) contained in the said compartment (27), lowered therein and while simultaneously exerting pressure from above on the product (19, 31, 32, 71, 72) can be retracted together therewith from the compartment (27), so that the product (19, 31, 32, 71, 72) can be pulled from the compartment (27) by means of the manipulator (25, 26; 57-62) onto a shelf (A, B, C, D, E, F) of said at least one shelf of the at least one handling device (8, 9, 10) positioned directly in front of the compartment (27), and
wherein the at least one storage rack comprises at least two storage racks (2, 3 or 6, 7) oriented at an angle to one another to each of which a handling device (8, 10) of said at least one handling device is allocated, wherein two handling devices (8, 10) can be moved into such a position adjacent to one another such that a product of the plurality of products (19, 31, 32, 71, 72) placed on a shelf (A, B, C, D) of said at least one shelf of a first or second handling device (8, 10) of said at least one handling device can be brought by means of the manipulator (25, 26; 57-62) of the first or second handling device (8, 10) onto a shelf (A, B, C, D) of the respective other handling device (8, 10).

15. An apparatus (1) for stocking and fully automatic output of a multiplicity of different products (19, 31, 32, 71, 72) having substantially cuboid geometry, comprising:
at least one permanently installed storage rack (2, 3, 4, 5, 6, 7) for stocking the multiplicity of products (19, 31, 32, 71, 72),
at least one selection station (16, 17) for selecting, from the multiplicity of stocked products (19, 31, 32, 71, 72), one product of the multiplicity of products (19, 31, 32, 71, 72) to be output by the apparatus (1) at a product output point (15),
at least one handling device (8, 9, 10) that is movable relative to the at least one storage rack (2, 3, 4, 5, 6, 7) for retrieval of a selected product of the multiplicity of products (19, 31, 32, 71, 72) from the at least one storage rack (2, 3, 4, 5, 6, 7) and for transport of the selected product (19, 31, 32, 71, 72) to the product output point (15) of the apparatus (1) and
at least one computer-assisted control unit (21) for controlling the apparatus (1) and its components,
wherein a separate compartment (27) of a plurality of separate compartments open on a front side (F2, F3, F4, F5, F6, F7) of the storage rack (2, 3, 4, 5, 6, 7) is provided in the at least one storage rack (2, 3, 4, 5, 6, 7) for each product of the multiplicity of products (19, 31, 32, 71, 72) and in that the at least one handling device (8) has at least one shelf (A, B, C, D, E, F) for a product of the multiplicity of products (19, 31, 32, 71, 72) to be transported with the at least one handling device (8, 9, 10) and a movable manipulator (25, 26; 57-62) for interacting with the multiplicity of products (19, 31, 32, 71, 72),
wherein the at least one handling device (8, 9, 10) and the manipulator (25, 26; 57-62) are configured and movable in such a way that the manipulator (25, 26; 57-62), with a free end (70) of flat shape, can be inserted into a compartment of the separate compartments (27) above a product of the multiplicity of products (19, 31, 32, 71, 72) contained in the said compartment (27), lowered therein and while simultaneously exerting pressure from above on the product (19, 31, 32, 71, 72) can be retracted together therewith from the compartment (27), so that the product (19, 31, 32, 71, 72) can be pulled from the compartment (27) by means of the manipulator (25, 26; 57-62) onto a shelf (A, B, C, D, E, F) of the at least one shelf of the at least one handling device (8, 9, 10) positioned directly in front of the compartment (27), and wherein two conveyor belts of the at least one handling device (8), which each define a support surface (A-F) of the handling device (8), are directly connected to one another in such a way that a product of the plurality of products (19, 31, 32, 71, 72) can be transferred by suitable control of the conveyor belts from a first to a second shelf (A/D, B/E, C/F) of the at least one shelf of the handling device (8).

\* \* \* \* \*